Jan. 16, 1951          G. E. LEVINGS          2,538,423

FLUID DRIVE

Filed Dec. 12, 1946          2 Sheets-Sheet 1

INVENTOR
George E. Levings.
BY
Morgan, Finnegan & Durham
ATTORNEYS

Jan. 16, 1951        G. E. LEVINGS        2,538,423
FLUID DRIVE

Filed Dec. 12, 1946        2 Sheets-Sheet 2

INVENTOR
George E. Levings
BY
Morgan, Finnegan & Durham
ATTORNEYS

Patented Jan. 16, 1951

2,538,423

UNITED STATES PATENT OFFICE 2,538,423

FLUID DRIVE

George E. Levings, West Point, N. Y.

Application December 12, 1946, Serial No. 715,724

4 Claims. (Cl. 192—58)

The invention relates to fluid drives and more particularly to an improved fluid drive coupling utilizing the principles of centrifugal force and adapted to translate mechanical energy from a power source or prime mover to a driven member or members in variable ratios and with varying degrees of flexibility.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Figure 1:
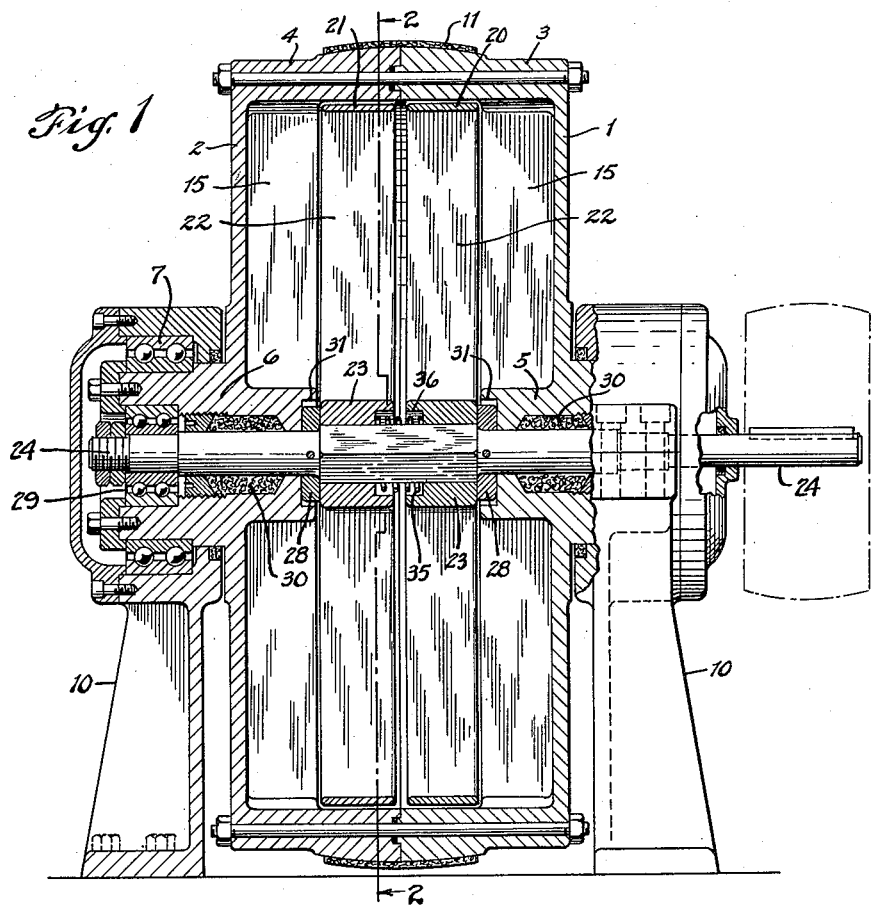
Fig. 1 is a vertical longitudinal section partly in elevation of a mechanism embodying the invention.
Figure 2:
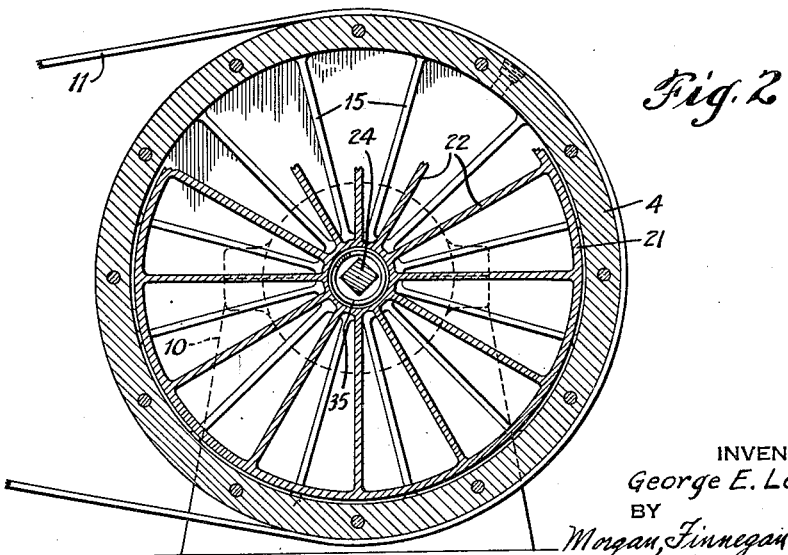
Fig. 2 is a section taken on line 2—2 of Fig. 1.

Objects of the invention are to provide an improved variable drive coupling between a central power source or prime mover and a driven member or members; utilizing fluid in said coupling and employing a novel application of centrifugal force to said fluid power transmission. By means of the novel features of the invention a maximum transmission of power may be effected through a fluid drive coupling without appreciable loss of energy due to turbulence, fluid friction and other losses occurring in presently known fluid drives. The application of the principles of the invention not only avoids such power losses, but also insures a highly efficient transmission of power while preserving all the normal flexible and variable speed and power ratios inherent in fluid drives and couplings.

Another object of the invention is to provide such fluid drive with additional means for producing variable energy outputs by means of automatically variable factors inherent in the construction of the fluid coupling. By means of this feature of the invention, the ratio of power applied to the coupling and delivered by the driven portion thereof may be automatically modified as desired.

Another object of the invention is to provide a fluid coupling embodying the hereinabove stated features of the invention and also having capacity to act as a differential permitting automatic application of different power ratios and speeds to two driven members or shafts from the same coupling and powered by the same power source.

Referring now in detail to the present preferred embodiment of the invention, same is shown generally diagrammatically in the accompanying drawings, and it will be understood that modifications in the mechanical and physical form thereof may be made in considerable degree without departing from the spirit and principal teachings of the invention.

As shown, the invention provides a rotatable cylindrical member or housing having solid circular end members 1 and 2 and cylindrical outer walls 3 and 4. Said housing provides a convenient vehicle for containing the power transmitting fluid and for receiving the power to be imparted to the coupling. For this purpose the cylindrical housing 3, 4 is designed to be rotated about its major axis, for that purpose being provided with central hubs 5 and 6 projecting from the end discs 1 and 2 respectively. Said hubs are mounted for rotation in any suitable bearings 7, said bearings being conventionally shown as trunnion bearings in suitable external supporting brackets 10 with respect to which the entire housing is rotatable. Said housing may be rotated in said bearings by any suitable power applying means such as the drive belt conventionally shown at 11, although it will be understood that this feature of the invention is not limited and the power may be applied by gearing; or the housing may comprise the rotor of an induction or other form of electrical motor, etc.

As stated, the main drive housing is designed to contain a suitable quantity of liquid (not shown) for effecting the fluid transmission and the interior of the housing is suitably sealed to retain said liquid therewithin. The liquid may be any suitable form of oil or other fluid normally employed for such purpose. The drive housing is preferably provided at either end with means for imparting driving force to the contained liquid and facilitating its powered rotation with the housing. For that purpose the inner face of each end disc 1 and 2 is provided with a plurality of radial fins or vanes 15 which extend from the axial hubs 5 and 6 respectively to the inner cylindrical wall of the housing. These fins which are fixed with relation to the housing may extend for any desired or suitable distance axially of the housing. In the preferred form they will occupy approximately one-half or more of the space between the inner face of the end wall or disc 1 or 2 and the transverse central plane of the housing. In other words, the two sets of fins 15 will preferably occupy about one-half of the axial length of the interior of the housing.

The invention provides means, mounted within said housing, and in cooperative relation with said driving or impelling devices, which means are adapted to be driven by transmission of power through the fluid previously described. As embodied, said driven means comprise preferably a pair of rotors 20 and 21. Said rotors are preferably formed as spiders comprising a plurality of radially disposed fins 22 terminating in annular rims at their perimeters and joined to hubs 23. Said hubs are slidably mounted upon a squared or splined portion of a centrally disposed driven shaft 24. Suitable stop collars 28 are provided to limit lateral movement in one direction of the hubs on the shaft. Shaft 24 is designed to move axially with respect to the driven housing and for that purpose the hubs 5 and 6 of said housing are preferably hollow so that the shaft may pass axially through them and be rotatably supported therein by means of interior bearings 29. Suitable sealing means 30 are provided in each hub for preventing the leakage of fluid from within the housing. The inner ends of the hubs 5 and 6 of the housing ends are preferably interiorly recessed at 31 to rotatably receive the washers 28 on the shaft.

While for many purposes the driven shaft 24 may constitute an integral single shaft unit and the rotors 20 and 21 thereon may likewise constitute a single vaned spider, a dual construction thereof may be provided as hereinafter disclosed because of its greater field of applicability.

In operation the housing of the above-described mechanism will be rotatably driven by the belt or other drive means from a prime mover or any other central power source, the housing being filled with suitable fluid as mentioned above. Upon rotation of the housing the fluid therewithin will rotate with it, such rotation of the fluid being enhanced by the action of the projecting fins 15. These forces will cause the central rotor 20—21 to rotate in the same direction, thereby applying the driving energy of the housing to the shaft 24 in a flexible manner. The centrifugal forces set up by the rotation will cause the fluid to build up pressure at the perimeter of the housing thereby exerting a maximum driving moment on the fins 22 of the rotor without appreciable loss of energy due to fluid turbulence and friction. Such turbulence and friction are kept to a minimum because of the fact that the entire system is rotating as a unit and the only differential of rotation is that existing between the driving liquid and the driven rotor, which is a useful power transmission loss.

In accordance with one feature of the invention I propose to provide means for automatically varying the energy or power ratio between the driving and the driven elements of my fluid drive, utilizing the principle that the resistance of the rotor to turning or doing work will cause it to seek to increase the axial gap between it and the impeller fins 15. In accordance with this feature of the invention I provide a rotor of varying width or axial dimension which automatically will respond to effect a variable ratio of power transmission, said ratio being some function of the square of the gap between each impeller 15 and the corresponding edge of the rotor fins 22.

For this purpose I preferably construct the driven rotor in two parts 20, 21 as previously described, said parts being mounted on the same shaft but normally urged apart from each other and thus toward the adjacent impeller fins 15. Such construction is shown in Fig. 1 wherein the driven shaft 24 supports the two segments 20 and 21 of the rotor. Said segments are articulated for radial rotation together on shaft 24, being splined or otherwise radially fixed for rotation therewith. However, said segments are adapted for independent or variable axial movement with respect to said shaft and each other and are normally urged apart toward the ends of the housing as by means of a compressed helical spring 35 which lies between the hubs of said rotors, said hubs being centrally socketed at 36 for that purpose. The spring normally urges the rotors apart and toward the ends of the housing so as to keep the gap between the impeller fins and the rotor fins at a minimum. As the resistance to work performed increases, the rotors will seek to move away from the impeller fins, and in doing so will compress the spring as the rotors move nearer each other. This movement thereby increases the ratio of power given to the housing over that delivered by the shaft and does so automatically, the ratio depending upon the adjustment of the parts as will be obvious.

Figure 3:
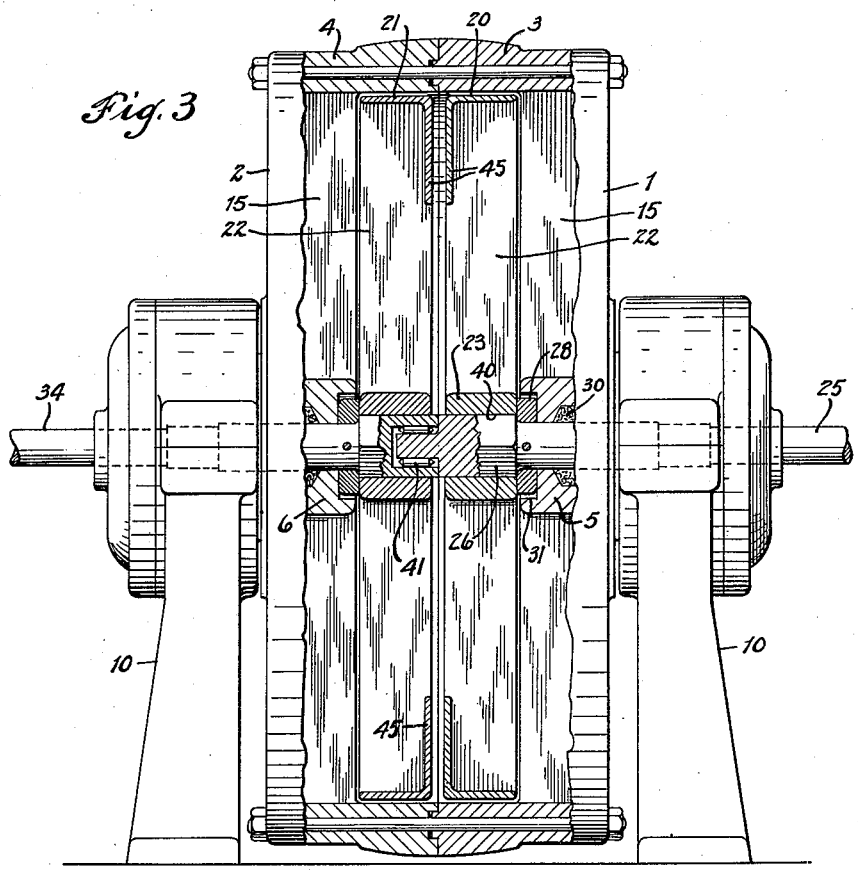
Fig. 3 is a side elevation partly in section of a modified form.

In accordance with the invention, the principles of my fluid coupling may also be applied to a differential drive. For this purpose the construction will be as shown in Fig. 3, that is embodying two separate driven rotors 20 and 21, each mounted on a separate driven shaft 25 and 34 respectively. Means are also provided for permitting a small lateral or axial displacement of each rotor on its shaft toward and away from the other, the respective rotors being fixed to rotate with their supporting shafts.

As shown in Fig. 3, for example, the hub of rotor 20 is provided with a square socket 40 mounted on square end 26 of shaft 25 and the construction of rotor 21 is similar. The length of the socket 40 and the length of the square shank 26 permit a short movement of translation of the rotor with respect to the shaft and a similar arrangement exists with respect to rotor 21 and shaft 34. In the form shown in Fig. 3 the two rotors are articulated for simultaneous axial displacement together but may rotate independently of each other. This arrangement may be effected by journalling the inner end of shaft 25 shown within the hollow end of shaft 34 as by needle bearings 41. With this arrangement an automatic differential action takes place. As one shaft, say 25, resists turning while the shaft 34 is more free to turn, the tendency of the resisting rotor is to slide away from the impeller fins and thereby diminish the gap between the opposite impeller fins and the rotor adjacent it. This displacement increases the power ratio of the driving source to the rotor with the smaller gap between impeller and rotor and at the same time decreases the other one, thus providing a different power ratio and different speeds of rotation of the two driven shafts. In the form shown in Fig. 3 the two rotors can turn independently of each other and thus one rotor acts as an impeller with relation to the other. When this relation exists, shielding web 45 is preferably placed on the interior or near side of each rotor perpendicular to the axis of rotation and said web may be varied in radial extent so as to control the amount of impulse transmitted from one rotor to the other as may be desired in the particular application involved.

While the invention has been shown and described as comprising a driving housing having impellers at its ends and centrally disposed driven rotor or rotors, it will be obvious that the opposite arrangement may also be employed—that is, the housing may be constructed as divided into three segments, the central one containing the impeller fins and thereby operating two rotors which may have more or less axial movement with respect to the ends of the housing.

Figure 4:
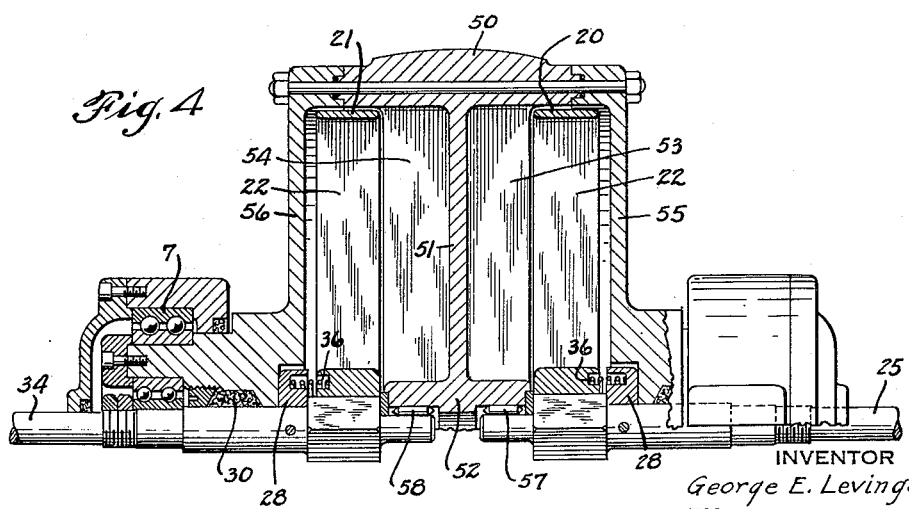
Fig. 4 is a vertical longitudinal quarter section of another modification of the invention.

This form is shown in Fig. 4 and as embodied comprises a central driving member 50 having a solid disc web portion 51 connecting the outer cylindrical part with a hub 52 and a plurality of impeller vanes 53 and 54 projecting from said web 51 in opposite directions and extending radially from the hub 52 to the inner wall of the cylindrical part. To each side of driving member 51 is secured end housings 55 and 56 which form the cavity within which the vaned rotors 20, 21 rotate. As shown in Fig. 4 rotor shafts 25, 34 are journalled at their inner ends on needle bearings 57, 58 carried in a hollow portion of hub 52. The outer ends are journalled as previously described in connection with the other forms shown.

It is obvious from an inspection of the drawings that if a single fluid drive rather than a differential drive is desired in the form generally shown in Fig. 4 the shafts 25, 34 may be replaced by a single shaft, similar to shaft 24, but having spaced apart squared or splined portions and enlarged centrally to permit it to be journalled in hub 52.

The invention in its broader aspects is not limited to the specific mechanisms shown and described but departures may be made therefrom within the scope of the accompanying claims without departing from the principles of the invention and without sacrificing its chief advantages.

What I claim is:

1. A fluid drive coupling including in combination, a rotatable fluid container having fluid impelling driving members rotatable therewith, a plurality of rotatable driven members within the housing, each of said driven members mounted on independent shafts axially aligned with the housing and loosely coupled to one another, and means for varying the relative spacing between said driving and driven members to vary the power ratio with respect to said members and for varying the speed of any rotatable driven member with respect to the speed of the other driven members.

2. A fluid drive coupling including in combination, a rotatable fluid container having fluid-impelling driving members rotatable therewith, first rotatable driven members within the housing and mounted on a first shaft axially aligned with said housing, further rotatable driven members within the housing and mounted on a second shaft axially aligned with respect to said first shaft, said shafts being loosely coupled to one another, and means for varying the relative spacing between said driving and driven members to vary the power ratio with respect to said members and for varying the speed of any rotatable driven member with respect to the speed of the other driven members.

3. A fluid drive coupling including in combination a rotatable fluid container having fluid-impelling driving members rotatable therewith, first rotatable driven members within the housing and mounted on a first shaft axially aligned with said housing, further rotatable driven members within the housing and mounted on a second shaft axially aligned with respect to said first shaft, means for loosely coupling said shafts so as to allow the speed of said driven members to differ from each other, means for normally urging said members into close fluid driving relation with the driving members, and means permitting limited independent variations in said relation with respect to said driving and driven members.

4. A fluid drive coupling including in combination a rotatable fluid container having a centrally located fluid-impelling driving member, first rotatable driven members within the housing and at one end of the housing, further rotatable driven members within the housing and at the opposite end of the housing from said first driven members, and means for varying the relative spacing between said driving and driven members to vary the power ratio with respect to said driven members.

GEORGE E. LEVINGS.

REFERENCES CITED

The following references are of record in the file of this patent:

UNITED STATES PATENTS

| Number | Name | Date |
| --- | --- | --- |
| 1,125,593 | Pinckney | Jan. 19, 1915 |
| 2,055,895 | Fawcett | Sept. 29, 1936 |
| 2,250,885 | Batten | July 29, 1941 |
| 2,318,187 | Addison | May 4, 1943 |
| 2,336,167 | Dillon | Dec. 7, 1943 |